(12) United States Patent
Birru et al.

(10) Patent No.: US 6,973,137 B2
(45) Date of Patent: Dec. 6, 2005

(54) APPARATUS AND METHOD FOR GENERATING ROBUST ATSC 8-VSB BIT STREAMS

(75) Inventors: Dagnachew Birru, Yorktown Heights, NY (US); Vasanth Reddy Gaddam, Ossining, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 728 days.

(21) Appl. No.: 10/011,968

(22) Filed: Dec. 3, 2001

(65) Prior Publication Data

US 2003/0103575 A1 Jun. 5, 2003

(51) Int. Cl.[7] .............................................. H04L 23/02
(52) U.S. Cl. ...................... 375/265; 375/270; 375/301; 714/756; 348/469
(58) Field of Search ................................ 375/261, 262, 375/265, 270, 301; 714/752, 755, 756, 792, 714/794; 348/21, 469, 470

(56) References Cited

U.S. PATENT DOCUMENTS 5,600,677 A * 2/1997 Citta et al. .................. 375/296
6,687,310 B1 * 2/2004 Fimoff et al. ............... 375/265
6,744,822 B1 * 6/2004 Gaddam et al. ............ 375/265

OTHER PUBLICATIONS

"Trellis Codes Modulation with Redundant Signal Sets Part" by G. Ungerboeck, IEEE Communications Magazine, vol. 25, No. 2, Feb. 1987.
"Principles of Communication Systems", by H. Taub et al, pp. 562-571, 1986.
U.S. Appl. No. 09/781,486, filed Feb. 12, 2001.

* cited by examiner

Primary Examiner—Dac V. Ha

(57) ABSTRACT

An apparatus and method is disclosed for generating robust ATSC 8-VSB bit streams for transmission by a digital transmitter. The apparatus comprises a Reed Solomon encoder unit that encodes a plurality of bit streams including bits to be encoded in a robust ATSC 8-VSB bit stream and bits to be encoded in a standard ATSC 8-VSB bit stream. The apparatus also comprises a trellis encoder unit comprising a symbol mapper unit in which an output symbol R is forced to a value of minus one minus alpha $(-1-\alpha)$ when R equals minus one $(-1)$ and to a value of plus one plus alpha $(+1+\alpha)$ when R equals plus one $(+1)$, where the value of alpha $(\alpha)$ is variable. A control block sets the value of alpha in accordance with the type of bits present within the trellis encoder unit to generate both robust and standard ATSC 8-VSB bit streams.

45 Claims, 7 Drawing Sheets

… as a third series. And so on for a total of twelve (12) series. Therefore, the ATSC Standard requires twelve (12) trellis decoders in the HDTV receiver for the twelve (12) series of time division interleaved data symbols in the signal. Each trellis decoder in the HDTV receiver decodes every twelfth (12th) data symbol in the stream of coded data symbols.

APPARATUS AND METHOD FOR GENERATING ROBUST ATSC 8-VSB BIT STREAMS

CROSS REFERENCE TO RELATED APPLICATION

This patent application is related to U.S. patent application Ser. No. 09/781,486 entitled SYSTEM AND METHOD FOR SENDING LOW RATE DATA ON A PACKET BASIS IN AN 8-VSB STANDARD DATA PACKET STREAM filed on Feb. 12, 2001. U.S. patent application Ser. No. 09/781,486 is commonly assigned to the assignee of the present patent application. The disclosures of U.S. patent application Ser. No. 09/781,486 are hereby incorporated by reference in the present patent application as if fully set forth herein.

TECHNICAL FIELD OF THE INVENTION

The present invention is directed, in general, to digital communications and, more specifically, to an apparatus and method for generating robust ATSC 8-VSB bit streams for transmission by a digital transmitter.

BACKGROUND OF THE INVENTION

The Digital High Definition Television (HDTV) Grand Alliance (Grand Alliance) is a group of television manufacturing and research organizations in the television industry. After years of cooperative effort the Grand Alliance developed and proposed a standard for digital HDTV systems. The Grand Alliance standard has been adopted (with a few changes) by the Federal Communication Commission (FCC) as an official broadcasting standard for HDTV. The standard is known as the Advanced Television Systems Committee Digital Television Standard (the "ATSC Standard").

The ATSC Standard for HDTV transmission over terrestrial broadcast channels uses a signal that consists of a sequence of twelve (12) independent time-multiplexed trellis-coded data streams modulated as an eight (8) level vestigial sideband (VSB) symbol stream with a rate of 10.76 MHz. This signal is converted to a six (6) MHz frequency band that corresponds to a standard VHF or UHF terrestrial television channel, over which the signal is then broadcast at a data rate of 19.39 million bits per second (Mbps).

The terrestrial VSB system uses a forward error correction (FEC) section that uses a rate ⅔ trellis encoder to correct random errors introduced by the channel, a 52 segment convolutional interleaver and a (207 bytes, 187 bytes) Reed Solomon (RS) encoder to correct burst errors and other impairments introduced by the wireless channel. The ATSC system can operate in a signal-to-white-Gaussian-noise ratio (SNR) of 14.9 dB. This corresponds to a segment error probability of $1.93 \times 10^{-4}$. This segment error probability corresponds to 2.5 segment errors per second.

The ATSC Standard calls for two (2) bit data symbols of the HDTV signal to be trellis encoded in accordance with an eight (8) level (i.e., a three (3) bit) one dimensional constellation. One bit of each data symbol is pre-coded, and the other is subjected to a ½ encoding rate that produces two coded bits in accordance with a four (4) state trellis code. For purposes of interleaving, twelve (12) identical encoders and pre-coders operate successively on every twelve successive data symbols. Symbols 0, 12, 24, 36, … are encoded as one series. Symbols 1, 13, 25, 37, … as a second series. Symbols 2, 14, 26, 38, … as a third series. And so on for a total of twelve (12) series. Therefore, the ATSC Standard requires twelve (12) trellis decoders in the HDTV receiver for the twelve (12) series of time division interleaved data symbols in the signal. Each trellis decoder in the HDTV receiver decodes every twelfth (12th) data symbol in the stream of coded data symbols.

In an ATSC Standard receiver trellis decoders are used to retrieve the original digital data that was trellis encoded just before being converted to 8-VSB symbols, modulated and broadcast. The use of trellis coding provides an improvement in the signal to noise ratio of the received signal, and the time multiplexing of twelve (12) independent streams reduces the possibility of co-channel interference from an analog NTSC broadcast signal residing on the same frequency. The abbreviation NTSC stands for National Television Standards Committee.

Each of the trellis decoders for the four (4) state trellis code operates in accordance with the well-known Viterbi decoding algorithm. Each of the decoders comprises a branch metric generator unit, an add-compare-select unit, and a path-memory unit. See, for example, "Trellis-coded Modulation With Redundant Signal Set, Part I, Introduction; Part II, State of the Art," by G. Ungerboeck, IEEE Communications Magazine, Vol. 25, pp. 5–21, February 1987.

In addition to being corrupted by noise, the transmitted signal is also subject to deterministic channel distortions and distortions caused by multipath interference. Consequently, an adaptive channel equalizer is generally used in front of the trellis decoders to compensate for these effects. The goal is to create a symbol stream that resembles, as much as possible, the symbol stream that was created by the twelve (12) trellis encoders at the transmitter.

One commonly used equalizer architecture makes use of a second equalizer known as a decision feedback equalizer (DFE). In this architecture, a conventional, or forward equalizer (FE) is supplemented by a DFE. The input to the DFE is an estimate of the original transmitted value of the current output symbol of the complete equalizer (FE and DFE). The output of the decision feedback equalizer (DFE) is subsequently added to the output of the forward equalizer (FE) to generate the output symbol. In a typical implementation, this estimate of the output symbol is obtained by simply "slicing" the equalizer output. The term "slicing" refers to the process of taking the allowed symbol value (of the eight (8) levels specified by the 8-VSB ATSC Standard) that is nearest to that of the actual output. Using the "sliced" symbols in a decision feedback equalizer (DFE) gives a near optimum error rate performance with low complexity. This approach, however, can suffer from error propagation caused by slicing errors. Because the typical symbol error rate after the equalizer for the HDTV signal can be up to twenty percent (20%), this can be a serious problem if the number of DFE filter taps is large.

After the equalizer, the HDTV signal is decoded in a trellis decoder that uses the Viterbi algorithm to decode the symbol stream based on the ½ rate trellis coding performed in the transmitter. As previously mentioned, the ATSC Standard specifies that twelve (12) trellis encoders and decoders are used in parallel in a time multiplexed fashion. Trellis decoding is then followed by byte de-interleaving and Reed Solomon decoding to further correct transmission errors in the signal.

The ATSC system performs well for video applications in additive white Gaussian noise channels and in benign multipath environments. However, the performance of the ATSC system may be quite poor in severe multipath environments.

The ATSC Forward Error Correction (FEC) specified by the ATSC Standard is not scalable. That is, the ATSC Standard does not provide for the transmission of bit streams that have varying levels of error correction capability.

There is therefore a need in the art for an apparatus and method that is capable of providing ATSC 8-VSB bit streams that have varying levels of error correction capability.

There is therefore also a need in the art for an apparatus and method that is capable of increasing the robustness of ATSC 8-VSB bit streams in order to improve the performance of ATSC systems in the presence of noise and multipath environments.

SUMMARY OF THE INVENTION

To address the deficiencies of the prior art mentioned above, the present invention provides an apparatus and method for generating and transmitting robust bit streams over a terrestrial channel using the ATSC 8-VSB modulation scheme.

The apparatus and method of the present invention provides a new ATSC 8-VSB bit stream ("New Stream") in which each bit in a first portion of the bits (e.g., half of the bits) is robust (the "Robust Stream"). The error correcting capacity of the bits in the Robust Stream is greater than the error correcting capacity of bits in a standard ATSC 8-VSB bit stream. The remaining portion of the bits in the new ATSC 8-VSB bit stream (e.g., the remaining half of the bits)(the "Embedded Stream") have the same error correcting capacity of standard ATSC 8-VSB bits.

The apparatus and method of the present invention is capable of multiplexing a New Stream and a regular ATSC bit stream ("Standard Stream"). The two bit streams are multiplexed and transmitted over a terrestrial channel by a transmitter according to a broadcaster defined bit rate ratio that regulates the proportion of the two bit streams.

The apparatus comprises a Reed Solomon encoder unit that encodes a plurality of bit streams including bits to be encoded in the Standard Stream and bits to be encoded in the Robust Stream and bits to be encoded in the Embedded Stream. The apparatus also comprises a trellis encoder unit comprising a symbol mapper unit in which an output symbol R is forced to a value of minus one minus alpha $(-1-\alpha)$ when R equals minus one $(-1)$ (i.e., when bit $Z_2$ equals zero (0), bit $Z_1$ equals one (1), and bit $Z_0$ equals one (1)) and in which an output symbol R is forced to a value of plus one plus alpha $(+1+\alpha)$ when R equals plus one $(+1)$ (i.e., when bit $Z_2$ equals one (1), bit $Z_1$ equals zero (2), and bit $Z_0$ equals zero (0)), where the value of alpha $(\alpha)$ is variable.

A control block sets the value of alpha $(\alpha)$ in accordance with the type of bits present within the trellis encoder unit to generate both robust and standard ATSC 8-VSB bit streams. When the control block sets the value of alpha $(\alpha)$ to zero (0) in the symbol mapper unit, then the trellis encoder unit encodes the bits in a Standard Stream. When the control block sets the value of alpha $(\alpha)$ to one (1) or two (2) in the symbol mapper unit, then the trellis encoder unit encodes the bits in a New Stream.

An optional non-systematic Reed Solomon encoder may be used with the apparatus and method of the present invention to satisfy requirements for backward compatibility with existing receivers.

It is an object of the present invention to provide an apparatus and method for generating and transmitting robust bit streams over a terrestrial channel using the ATSC 8-VSB modulation scheme.

It is another object of the present invention to provide a symbol mapper unit within a trellis encoder unit in which an output symbol R is forced to a value of minus one minus alpha $(-1-\alpha)$ when R equals minus one $(-1)$ (i.e., when bit combination $Z_2\ Z_1\ Z_0$ equals zero one one (011)) and in which an output symbol R is forced to a value of plus one plus alpha $(+1+\alpha)$ when R equals plus one $(+1)$ (i.e., when bit combination $Z_2\ Z_1\ Z_0$ equals one zero zero (100)), where the value of alpha $(\alpha)$ is variable.

It is also an object of the present invention to provide a control block for setting the value of alpha $(\alpha)$ in accordance with the type of bits present within the trellis encoder unit of the present invention.

It is another object of the present invention to provide an apparatus and method for multiplexing Robust Streams and Embedded Streams to form a New Stream of bits.

It is also an object of the present invention to provide an apparatus and method for multiplexing New Streams of bits and Standard Streams of bits for transmission by a digital transmitter.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the Detailed Description of the Invention, it may be advantageous to set forth definitions of certain words and phrases used throughout this patent document: the terms "include" and "comprise" and derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller," "processor," or "apparatus" means any device, system or part thereof that controls at least one operation, such a device may be implemented in hardware, firmware or software, or some combination of at least two of the same. It should be noted that the functionality associated with any particular controller may be centralized or distributed, whether locally or remotely. In particular, a controller may comprise one or more data processors, and associated input/output devices and memory, that execute one or more application programs and/or an operating system program. Definitions for certain words and phrases are provided throughout this patent document. Those of ordinary skill in the art should understand that in many, if not most instances, such definitions apply to prior uses, as well as future uses, of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

FIGS. 1 through 7, discussed below, and the various embodiments used to describe the principles of the present invention in this patent document are by way of illustration only and should not be construed in any way to limit the scope of the invention. The present invention for transmitting robust ATSC 8-VSB bit streams may be used in any transmitter that transmits digital data signals using an ATSC 8-VSB modulation scheme.

In the description of the exemplary embodiment that follows, the present invention is integrated into, or is used in connection with, a transmitter of digital television signals. The present invention is not limited to use with digital television signals. Those skilled in the art will recognize that the exemplary embodiment of the present invention may easily be modified for use in any type of digital communication system that transmits digital data signals using an ATSC 8-VSB modulation scheme. The term "ATSC 8-VSB digital communication system" is used to refer to this type of digital communication system.

Figure 1:
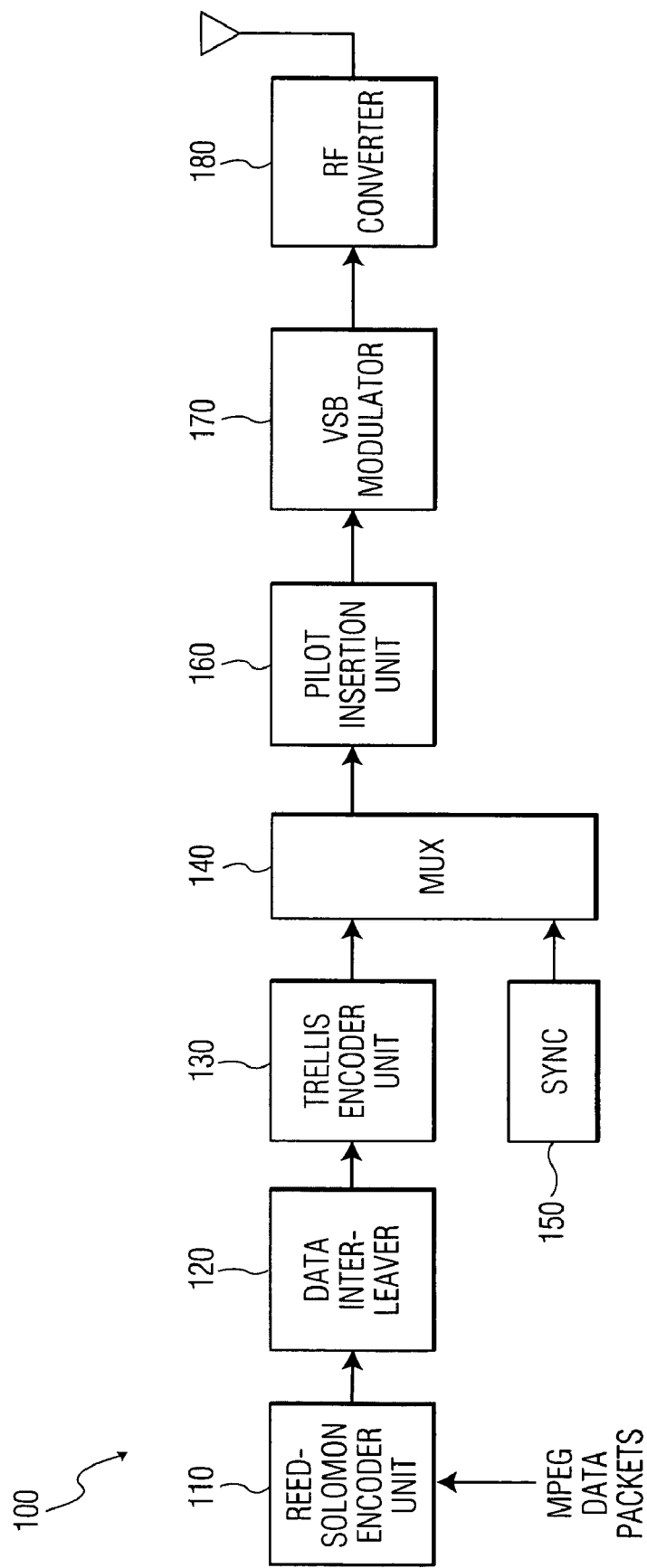
FIG. 1 illustrates a block diagram of an exemplary prior art high definition television (HDTV) transmitter.

FIG. 1 illustrates a block diagram of an exemplary prior art high definition television (HDTV) transmitter 100. MPEG compatible data packets are encoded for forward error correction (FEC) by a Reed Solomon (RS) encoder unit 110. The data packets in successive segments of each data field are then interleaved by data interleaver 120, and the interleaved data packets are then further interleaved and encoded by trellis encoder unit 130. Trellis encoder unit 130 produces a stream of data symbols having three (3) bits each. One of the three bits is pre-coded and the other two bits are produced by a four (4) state trellis encoding.

As will be more fully discussed, trellis encoder unit 130 comprises twelve (12) parallel trellis encoder and pre-coder units to provide twelve interleaved coded data sequences. In multiplexer 140 the encoded three (3) bits of each trellis encoder and pre-coder unit are combined with "segment sync" and "field sync" synchronization bit sequences from synchronization unit 150. A pilot signal is then inserted by pilot insertion unit 160. The data stream is then subjected to vestigial sideband (VSB) suppressed carrier modulation by VSB modulator 170. The data stream is then finally up-converted to a radio frequency by radio frequency (RF) converter 180.

Figure 2:
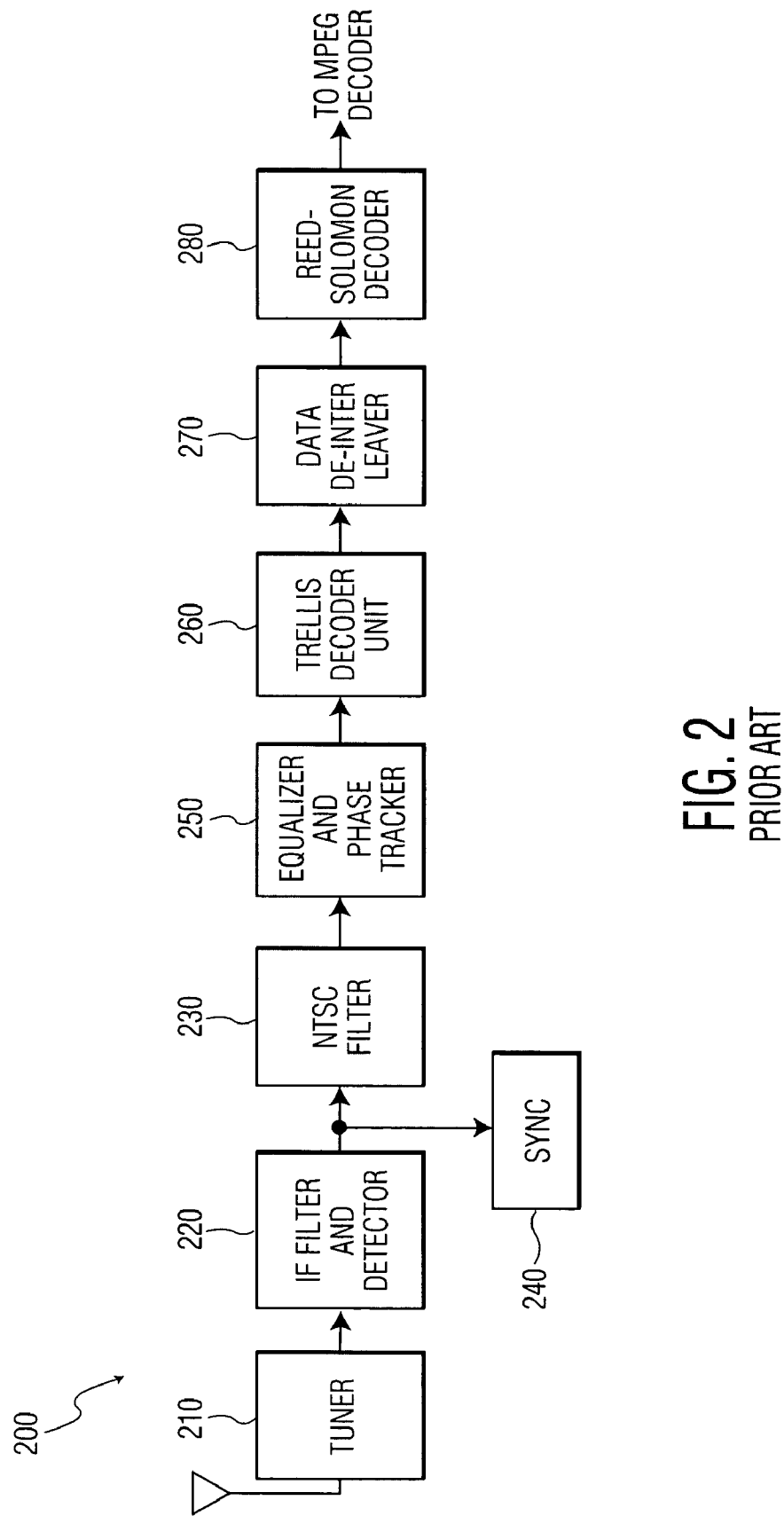
FIG. 2 illustrates a block diagram of an exemplary prior art high definition television (HDTV) receiver.

FIG. 2 illustrates a block diagram of an exemplary prior art high definition television (HDTV) receiver 200. The received RF signal is down-converted to an intermediate frequency (IF) by tuner 210. The signal is then filtered and converted to digital form by IF filter and detector 220. The detected signal is then in the form of a stream of data symbols that each signify a level in an eight (8) level constellation. The signal is then provided to NTSC rejection filter 230 and to synchronization unit 240. Then the signal is filtered in NTSC rejection filter 230 and subjected to equalization and phase tracking by equalizer and phase tracker 250. The recovered encoded data symbols are then subjected to trellis decoding by trellis decoder unit 260. The decoded data symbols are then further de-interleaved by data de-interleaver 270. The data symbols are then subjected to Reed Solomon decoding by Reed Solomon decoder 280. This recovers the MPEG compatible data packets transmitted by transmitter 100.

Figure 3:
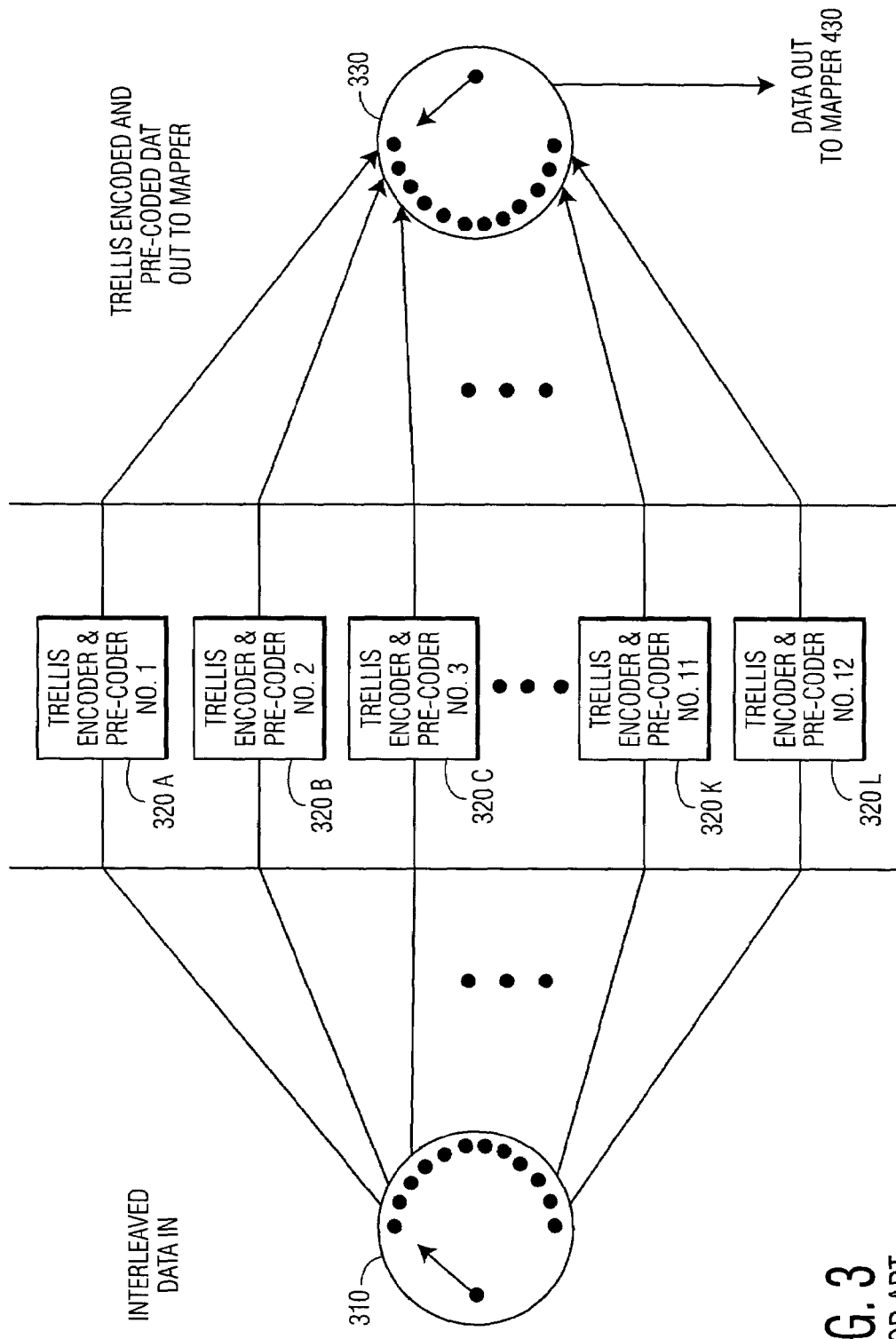
FIG. 3 illustrates a block diagram of a prior art trellis encoder comprising twelve (12) parallel trellis encoder and pre-coder units for twelve groups of interleaved data symbols.

FIG. 3 illustrates how the interleaved data from data interleaver 120 are further interleaved during the trellis encoding process. Demultiplexer 310 of trellis encoder unit 130 distributes each successive series of twelve (12) data symbols among twelve (12) successive trellis encoder and pre-coder units, 320A, 320B, . . . , 320K, and 320L. The encoded outputs of the twelve (12) successive trellis encoder and pre-coder units are then time division multiplexed by multiplexer 330 to form a single data stream. The single data stream is sent to an eight (8) level symbol mapper 430 (shown in FIG. 4) within trellis encoder unit 130.

Figure 4:
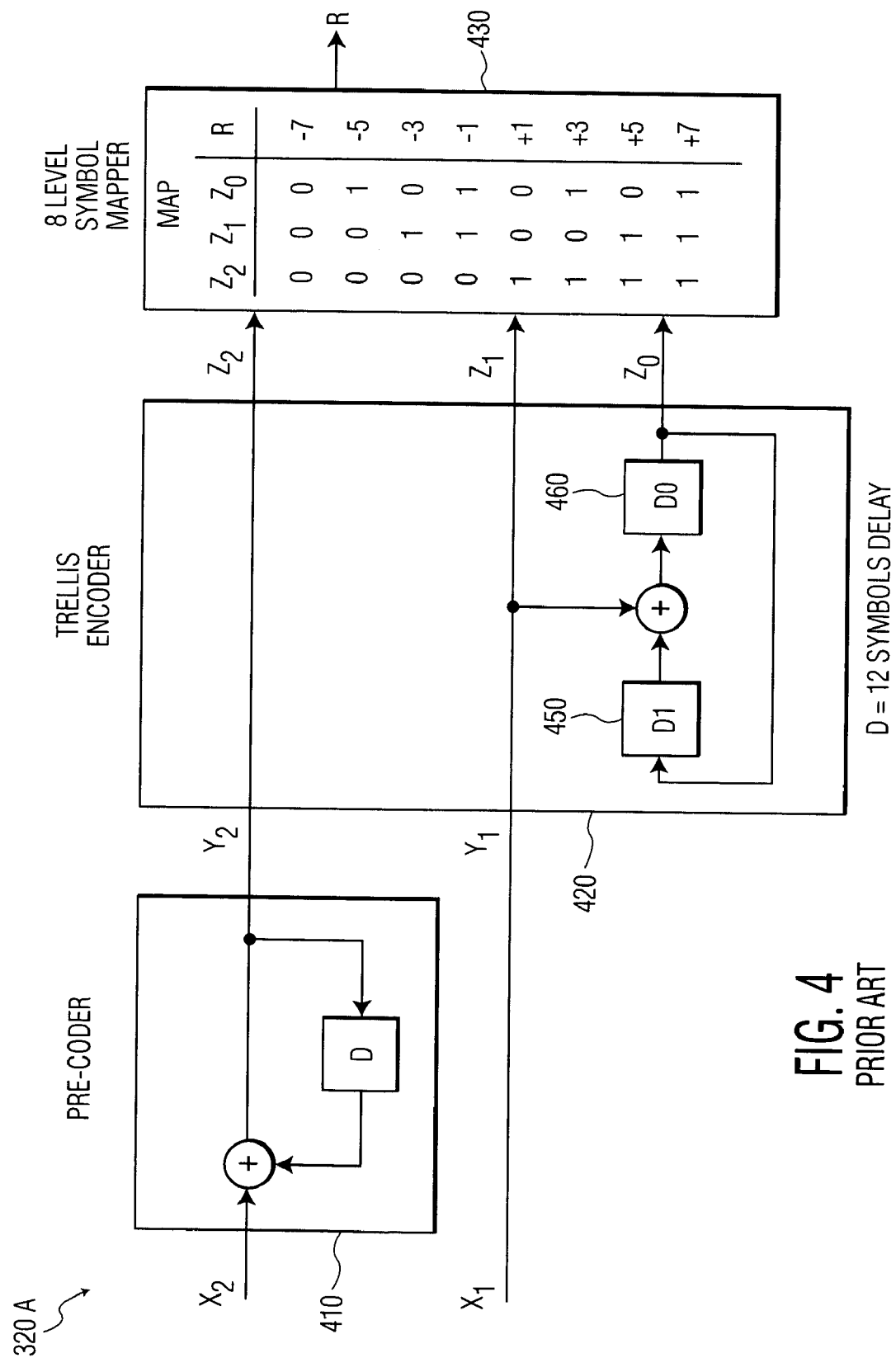
FIG. 4 illustrates a block diagram of one exemplary prior art trellis encoder and pre-coder unit (one of the twelve (12) such units shown in FIG. 3) and an eight (8) level symbol mapper.

FIG. 4 illustrates a block diagram of an exemplary prior art trellis encoder and pre-coder unit 320A and its output to an eight (8) level symbol mapper 430. Multiplexer 330 that couples trellis encoder and pre-coder unit 320A to eight (8) level symbol mapper 430 is not shown in FIG. 4. Trellis encoder and pre-coder unit 320A comprises pre-coder 410 and trellis encoder 420. Each data symbol to be encoded comprises two bits, $X_1$ and $X_2$. Bit $X_2$ is pre-coded by pre-coder 410 which comprises a one bit register 440 to derive pre-coded bit $Y_2$. Bit $Y_2$ is not altered further by trellis encoder 420 and is output as bit $Z_2$.

The other input bit, $X_1$, does not pass through pre-coder 410. Bit $X_1$ (also denoted bit $Y_1$) does pass through trellis encoder 420. Trellis encoder 420 encodes bit $X_1$ in accordance with a ½ trellis code utilizing one bit data registers, 450 and 460. The result is output as bit $Z_0$ and bit $Z_1$. Therefore, three bits (i.e., bit $Z_0$, bit $Z_1$, and bit $Z_2$) are output by trellis encoder 420 to eight (8) level symbol mapper 430. Eight (8) level symbol mapper 430 converts the three bits to a value R in an eight (8) level constellation of permissible code values. The permissible code values for R are −7, −5, −3, −1, +1, +3, +5, and +7. These values correspond with the three bit combinations shown in eight (8) level symbol mapper 430.

The process described above is carried out for each of the twelve interleaved series of data symbols. Eight (8) level symbol mapper 430 comprises a look-up table for selecting the correct R code value for a given set of three input bits. It is seen that the eight (8) level constellation has four possible subsets of bits $Z_0$ and $Z_1$, each subset having dual possible constellation values depending upon whether the pre-coded bit $Z_2$ is a zero ("0") or a one ("1"). For a basic description of the logic operations involved in trellis encoding and decoding, refer to "Principles of Communication Systems," by H. Taub et al., McGraw Hill Book Company, pp. 562–571, 1986.

Figure 5:
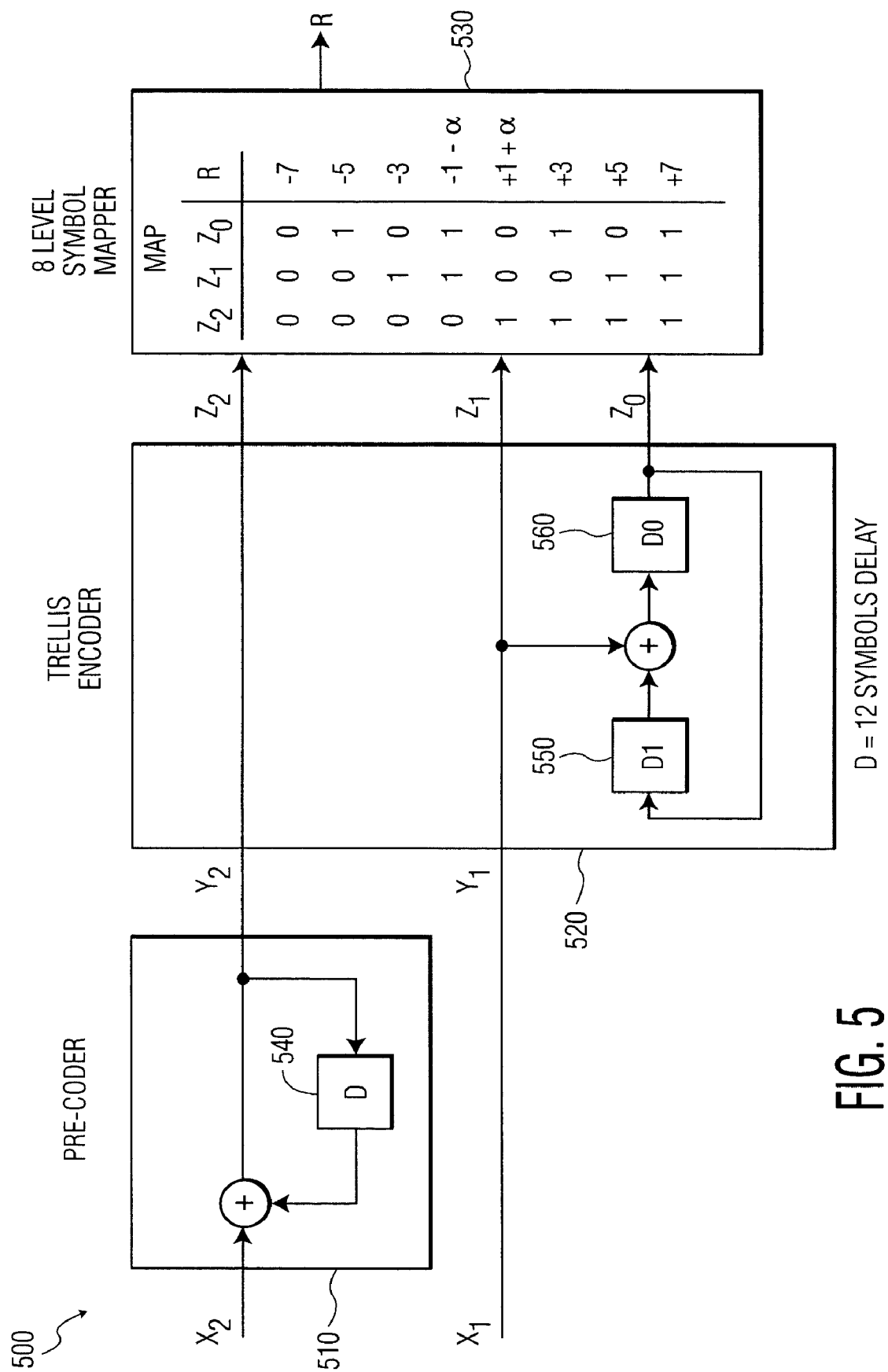
FIG. 5 illustrates a block diagram of a trellis encoder and pre-coder unit in accordance with the principles of the present invention.

FIG. 5 illustrates a block diagram of an exemplary trellis encoder and pre-coder unit 600 in accordance with the principles of the present invention. Multiplexer 330 that couples trellis encoder and pre-coder unit 500 to eight (8) level symbol mapper 530 is not shown in FIG. 5. Trellis encoder and pre-coder unit 500 comprises pre-coder 510 and trellis encoder 520. Each data symbol to be encoded comprises two bits, $X_1$ and $X_2$. Bit $X_2$ is pre-coded by pre-coder 510 which comprises a one bit register 540 to derive precoded bit $Y_2$. Bit $Y_2$ is not altered further by trellis encoder 520 and is output as bit $Z_2$.

The other input bit, $X_1$, does not pass through pre-coder 510. Bit $X_1$ (also denoted bit $Y_1$) does pass through trellis encoder 520. Trellis encoder 520 encodes bit $X_1$ in accordance with a ½ rate trellis code utilizing one bit data registers, 550 and 560. The result is output as bit $Z_0$ and bit $Z_1$. Therefore, three bits (i.e., bit $Z_0$, bit $Z_1$, and bit $Z_2$) are output by trellis encoder 520 to eight (8) level symbol mapper 530. Eight (8) level symbol mapper 530 converts the three bits to a value R in an eight (8) level constellation of permissible code values. The permissible code values for R are −7, −5, −3, (−1 −α), (+1 +a), +3, +5, and +7 where the value of a may be zero (0), or one (1), or two (2). The permissible code values for R correspond with the three bit combinations shown in eight (8) level symbol mapper 530. When the value of α is zero (0), then eight (8) level symbol mapper 530 is equivalent to prior art eight (8) level symbol mapper 430.

The process described above for trellis encoder and pre-coder unit 500 is carried out for each of the twelve interleaved series of data symbols. Eight (8) level symbol mapper 530 comprises a look-up table for selecting the correct R code value for a given set of three input bits.

Figure 6:
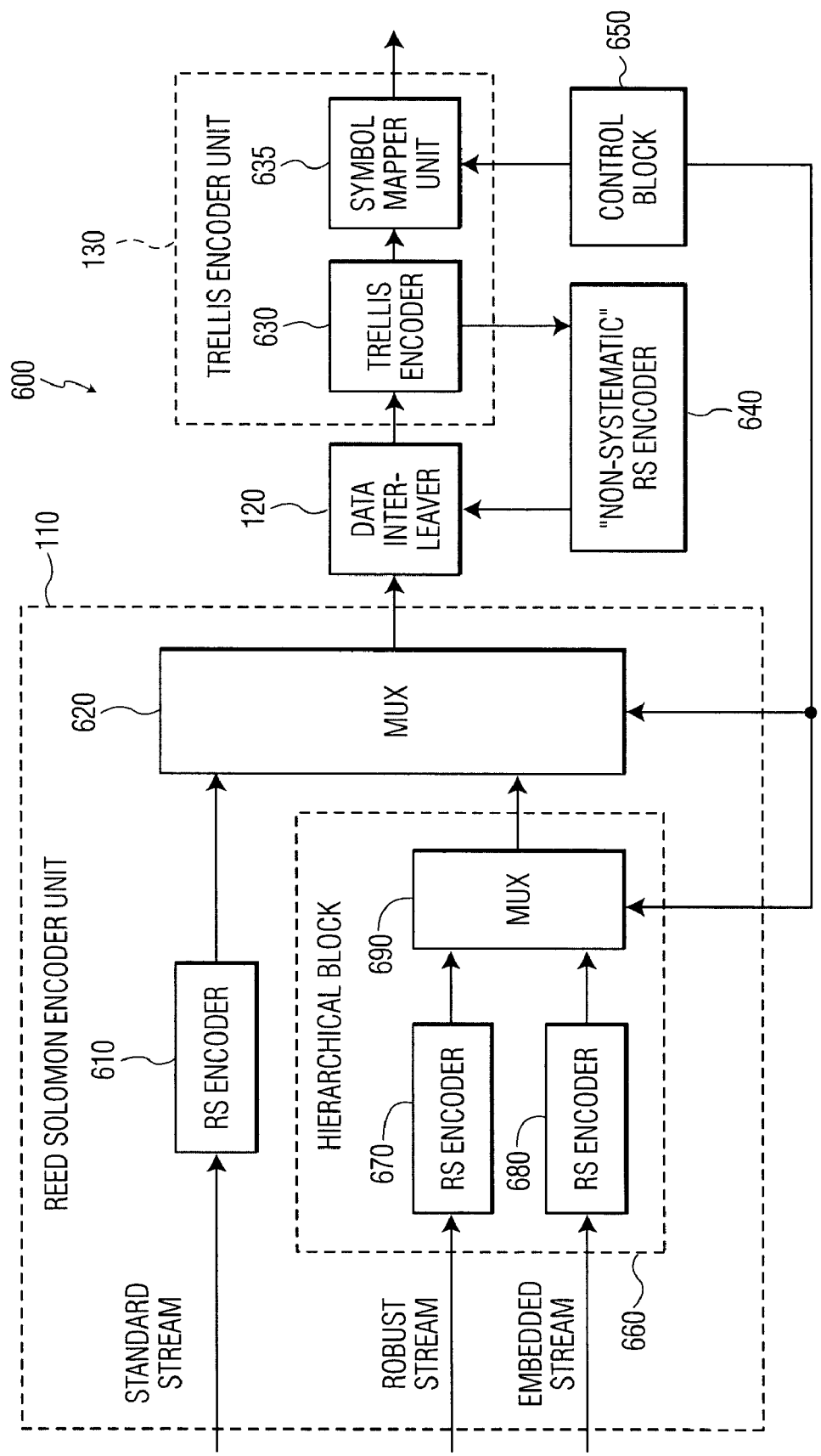
FIG. 6 illustrates a block diagram showing a Reed Solomon encoder unit with a hierarchical block, a trellis encoder unit, a control block, and an optional non-systematic Reed Solomon encoder.

FIG. 6 illustrates a block diagram 600 of Reed Solomon encoder unit 110 of the present invention comprising hierarchical block 660. FIG. 6 also illustrates trellis encoder unit 130 and control block 650 of the present invention. FIG. 6 also illustrates an optional "non-systematic" Reed Solomon encoder 640. The term "non-systematic" differentiates Reed Solomon encoder 640 from the "systematic" Reed Solomon encoder used in the ATSC Standard.

Reed Solomon encoder unit 110 receives a regular ATSC 8-VSB bit stream in Reed Solomon (RS) encoder 610. The regular ATSC 8-VSB bit stream is referred to as a Standard Stream (SS). The output of RS encoder 610 is provided to multiplexer (MUX) 620.

Standard Streams that are output from multiplexer 620 are provided to data interleaver 120 and then to trellis encoder unit 130. When a Standard Stream is being trellis encoded in trellis encoder unit 130, control block 650 sets the value of α in symbol mapper unit 635 to zero (0). In this manner Standard Streams are handled in the same manner as prior art ATSC 8-VSB bit streams.

The present invention comprises an apparatus and method for using a new type of ATSC 8-VSB bit stream. The new type of ATSC 8-VSB bit steam is referred to as a New Stream (NS). Each New Stream of bits comprises (1) a bit stream of bits that have an increased level of robustness (a "robust" bit stream), and (2) a bit stream of bits that have the same level of error correcting capability as a standard bit stream (an "embedded" bit stream). In one advantageous embodiment of the present invention, half of the bits in a New Stream are robust bits (Robust Stream) and the remaining half of the bits are embedded bits (Embedded Stream).

The present invention will be described for a New Stream that has one half robust bits and one half embedded bits. However, it is clear that the present invention is not necessarily limited to a New Stream having a one to one (1:1) ratio of robust bits to embedded bits.

A demultiplexer (not shown) located before Reed Solomon encoder unit 110 separates each New Stream into a Robust Stream component and an Embedded Stream component. Reed Solomon encoder unit 110 receives the Robust Streams and the Embedded Streams in hierarchical block 660. The Robust Streams are provided to Reed Solomon (RS) encoder 670. The Embedded Streams are provided to Reed Solomon (RS) encoder 680. The output of RS encoder 670 and RS encoder 680 are provided to multiplexer (MUX) 690 of hierarchical block 660. Multiplexer (MUX) 690 multiplexes the Reed Solomon encoded Robust Stream and the Reed Solomon encoded Embedded Stream to create a multiplexed Reed Solomon encoded New Stream.

As shown in FIG. 6, the Standard Stream from Reed Solomon (RS) encoder 610 and the New Stream from multiplexer (MUX) 690 are multiplexed on a packet basis in multiplexer (MUX) 620. The multiplexed Standard Stream and New Stream from multiplexer (MUX) 620 are passed through convolutional data interleaver 120 and then trellis encoded in trellis encoder unit 130.

Data interleaver 120 rearranges the bytes of the multiplexed Standard Stream and New Stream during the interleaving process. Because of this a mechanism is needed to track the bytes and identify the bytes in trellis encoder unit 130. Control block 650 generates the control information that is needed to perform the function of identifying the bytes. Several prior art methods exist for performing this portion of the function of control block 650.

Control block 650 is coupled to multiplexer 620, and to multiplexer 690, and to symbol mapper unit 635 of trellis encoder unit 130. Control block 650 sends control signals to control the operation of multiplexer 620, multiplexer 690, and symbol mapper unit 635. Control block 650 is also coupled to data interleaver 120. The connection of control block 650 to data interleaver 120 (not shown in FIG. 6) permits control block 650 to receive information from data interleaver 120 in order to identify and track bytes through data interleaver 120.

Trellis encoder 630 encodes bytes belonging to the multiplexed Standard Stream and New Stream. Trellis encoder 630 maps the symbols generated by the Standard Stream bytes and by the New Stream bytes in symbol mapper unit 635. When Standard Stream bytes are present in trellis encoder 630 control block 650 sets the value of α equal to zero (0) in symbol mapper unit 635. When New Stream bytes are present in trellis encoder 630 control block 650 sets the value of α equal to one (1) in symbol mapper unit 635. In an alternate advantageous embodiment of the present invention, when New Stream bytes are present in trellis encoder 630 control block 650 sets the value of α equal to two (2) in symbol mapper unit 635.

As shown in FIG. 5, if the value of α is set equal to one (1) then the R value for the bit combination zero one one (011) is minus two (−2) and the R value for the bit combination one zero zero (100) is plus two (+2). Because the $X_2$ bit can be derived from the sign information of the received symbol, increasing the distance between the −1 level and the +1 level improves the reliability of the $X_2$ bit at the decoder.

Specifically, when the value of α is set equal to zero (0) the distance between the −1 level and the +1 level is two (2) units. When the value of α is set equal to one (1) the distance between the −2 level and the +2 level is equal to four (4) units. Setting the value of α equal to one (1) increases in distance between the R value for the bit combination zero one one (011) and the R value for the bit combination of one zero zero (100) from (2) units to four (4) units. As previously mentioned, this improves the reliability of the $X_2$ bit at the decoder.

In an alternate advantageous embodiment of the present invention, control block 650 sets the value of α equal to two (2) in symbol mapper unit 635. When the value of α is set equal to two (2) the distance between the −3 level and the +3 level is equal to six (6) units. In this alternate advantageous embodiment of the present invention, the $Z_2 Z_1 Z_0$ bits "010" and the $Z_2 Z_1 Z_0$ bits "011" both give the same R value of minus three (−3). This is not a problem because for the Robust Stream only the sign of the received symbol is needed. So for both "010" and "011" the sign is negative and the decoded bit $X_2$ is zero (0). Similarly, the $Z_2 Z_1 Z_0$ bits "100" and the $Z_2 Z_1 Z_0$ bits "101" both give the same R value of plus three (+3). For both "100" and "101" the sign is positive and the decoded bit $X_1$ is one (1).

Using the apparatus and method of the present invention, the high priority bits in a New Stream (i.e., the Robust Stream) can be sent to the $X_2$ input of trellis encoder 630 and the low priority bits in a New Stream (i.e., the Embedded Stream) can be sent to the $X_1$ input of trellis encoder 630. Multiplexer 690 ensures that the $X_2$ input of trellis encoder 630 receives the Robust Stream bits and that the $X_1$ input of trellis encoder 630 receives the Embedded Stream bits.

Depending on such factors as location and mobility, a receiver that is designed to receive the New Streams of the present invention can decode the high priority information in the Robust Stream even in severe channel conditions (low signal to noise ratio (SNR), strong multi-path, etc.). If the signal to noise ratio (SNR) is sufficiently large, the receiver can also decode the low priority information (i.e., Standard Streams and Embedded Streams).

In a standard receiver that is not designed to receive the New Streams of the present invention, the Embedded Streams within the New Streams will cause some errors during the trellis decoding process. As a result, a standard receiver will use some of its error correcting capability to correct these errors. This will cause the threshold of visibility (TOV) to increase by a small amount. After all of the packets have corrected by the forward error correction (FEC) portion of the standard receiver, the transport layer (or the MPEG decoder) of the standard receiver will discard the packets that belong to the New Streams and will only use packets that belong to the Standard Stream for source decoding.

If the signal to noise ratio (SNR) is low, a trellis decoder of a receiver that is designed to receive the New Streams of the present invention would be able to correctly decode the robust $X_2$ bits but would not be able to correctly decode the $X_1$ bits. Because a byte is made up of both $X_1$ bits and $X_2$ bits, the inability to correctly decode the $X_1$ bits would cause byte errors at the Reed Solomon (RS) decoder input. This would result in packet errors at the Reed Solomon (RS) decoder output.

This problem is avoided by using Reed Solomon encoder 670 and Reed Solomon encoder 680 of hierarchical block 660. As shown in FIG. 6, hierarchical block 660 encodes packets containing the $X_1$ bits using RS encoder 680. Hierarchical block 660 also encodes packets containing the $X_2$ bits using RS encoder 670. The output of RS encoder 680 and the output of RS encoder 670 are multiplexed in multiplexer (MUX) 690 to form byte input to the forward error correction (FEC) block of ATSC transmitter 100. Receivers can be designed to take advantage of this feature to produce error free packets even at very low signal to noise ratio (SNR) values.

Also shown in FIG. 6 is a "non-systematic" Reed Solomon (RS) encoder 640. "Non-systematic" Reed Solomon (RS) encoder 640 is an optional system that may be used with the present invention to satisfy backward compatibility requirements in standard digital transmitters. An advantageous embodiment of Reed Solomon (RS) encoder 640 is set forth and described in U.S. patent application Ser. No. 09/781,486 entitled "System and Method for Sending Low Rate Data on a Packet Basis in an 8-VSB Standard Data Packet Stream" filed on Feb. 12, 2001. The disclosures of U.S. patent application Ser. No. 09/781,486 are hereby incorporated by reference in the present patent application as if fully set forth herein.

The encoding functions of Reed Solomon encoder 610, Reed Solomon encoder 670, and Reed Solomon encoder 680 may be implemented in either hardware or software. In an alternate advantageous embodiment of the present invention, the Reed Solomon encoding functions are executed in a software implemented Reed Solomon encoder.

Figure 7:
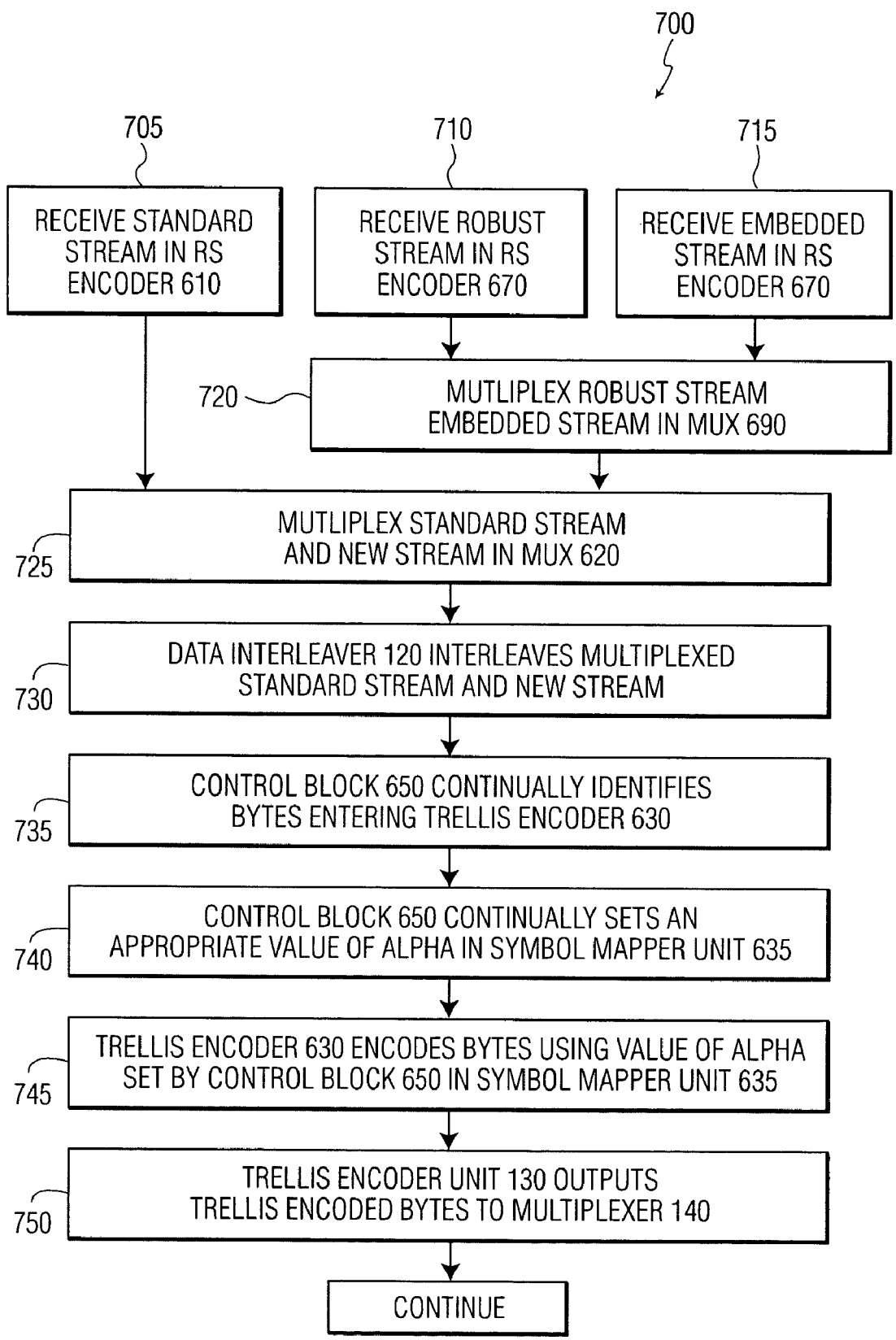
FIG. 7 illustrates a flowchart showing the steps of a method of one advantageous embodiment of the present invention.

FIG. 7 illustrates a flowchart showing the steps of the method of the present invention. The steps are collectively referred to with reference numeral 700. Reed Solomon encoder unit 110 receives a Standard Stream of bits in Reed Solomon encoder 610 (step 705). Reed Solomon encoder unit 110 also receives a Robust Stream of bits in Reed Solomon encoder 670 within hierarchical block 660 (step 710). Reed Solomon encoder unit 110 also receives an Embedded Stream of bits in Reed Solomon encoder 680 within hierarchical block 660 (step 715).

Hierarchical block 660 multiplexes the Robust Stream from Reed Solomon encoder 670 and the Embedded Stream from Reed Solomon encoder 680 in multiplexer 690 to form a New Stream (step 720). In multiplexer 620 Reed Solomon encoder unit 110 multiplexes the Standard Stream from Reed Solomon encoder 610 with the New Stream from multiplexer 690 (step 725).

Then data interleaver 120 interleaves the multiplexed Standard Stream and New Stream (step 730). Control block 650 monitors the operation of data interleaver 120 and continually identifies the bytes that enter trellis encoder 630 (step 735). Using the identification of the bytes present in trellis encoder 630 control block 650 continually sets an appropriate value of α in symbol mapper unit 635 of trellis encoder unit 130 (step 740). As previously mentioned, the value of α is set equal to zero (0) for Standard Stream bits. The value of α is set equal to one (1), or alternatively, to two (2), for New Stream bits.

Trellis encoder 630 then encodes the bytes using the value of α set by control block 650 in symbol mapper unit 635 (step 745). Trellis encoder unit 130 then outputs the trellis encoded symbols to multiplexer 140 (step 750).

Control block 650 continues to change the value of α in accordance with the type of bit stream present in trellis encoder 630. In this manner control block 650 changes the values of the R levels in symbol mapper unit 635 to increase the probability of detecting the bits within the Robust Stream of bits.

While the present invention has been described in detail with respect to certain embodiments thereof, those skilled in the art should understand that they can make various changes, substitutions modifications, alterations, and adaptations in the present invention without departing from the concept and scope of the invention in its broadest form.

What is claimed is:

1. An apparatus for generating an Advanced Television Systems Committee (ATSC) 8-VSB bit stream that comprises a robust ATSC 8-VSB bit stream, said apparatus comprising:
 a Reed Solomon encoder unit capable of encoding a plurality of ATSC 8-VSB bit streams, said Reed Solomon encoder unit comprising:
 a first Reed Solomon encoder capable of encoding a first bit stream that comprises a standard ATSC 8-VSB bit stream;
 a hierarchical block capable of encoding a second bit stream, wherein said second bit stream comprises a first portion of bits to be encoded as robust ATSC 8-VSB bits and a second portion of bits to be encoded as standard embedded ATSC 8-VSB bits; and
 a first multiplexer having a first input coupled to an output of said first Reed Solomon encoder and having a second input coupled to an output of said hierarchical block, said multiplexer capable of multiplexing said first bit stream and said second bit stream.

2. An apparatus as claimed in claim 1 wherein said first bit stream received by said first Reed Solomon encoder comprises a standard stream of bits and wherein said second bit stream received by said hierarchical block comprises a new stream of bits.

3. An apparatus as claimed in claim 1 wherein said first portion of bits to be encoded as robust ATSC 8-VSB bits comprises half of the bits received by said hierarchical block and wherein said second portion of bits to be encoded as standard embedded ATSC 8-VSB bits comprises half of the bits received by said hierarchical block.

4. An apparatus as claimed in claim 1 wherein said hierarchical block comprises:
 a second Reed Solomon encoder capable of encoding said first portion of bits to be encoded as robust ATSC 8-VSB bits;
 a third Reed Solomon encoder capable of encoding said second portion of bits to be encoded as standard ATSC 8-VSB bits; and
 a second multiplexer having a first input coupled to an output of said second Reed Solomon encoder and having a second input coupled to an output of said third Reed Solomon encoder, said second multiplexer capable of multiplexing said first portion of bits and said second portion of bits, said second multiplexer having an output coupled to an input of said first multiplexer.

5. An apparatus as claimed in claim 4 wherein said apparatus further comprises a trellis encoder unit capable of being coupled to an output of a data interleaver unit coupled to an output of said first multiplexer of said Reed Solomon encoder unit, said trellis encoder unit comprising:
 a trellis encoder coupled to said output of said data interleaver unit; and
 a symbol mapper unit coupled to said trellis encoder, wherein said symbol mapper unit has an output symbol R value of minus one minus alpha ($-1+\alpha$) assigned to a $Z_2$ $Z_1$ $Z_0$ bit combination of zero one one (011), and wherein said symbol mapper unit has an R value of plus one plus alpha ($+1+\alpha$) assigned to a $Z_2$ $Z_1$ $Z_0$ bit combination of one zero zero (100), where alpha ($\alpha$) has a variable integer value.

6. An apparatus as claimed in claim 5 further comprising a control block coupled to said data interleaver unit and to said symbol mapper unit, wherein said control block is capable of identifying bytes within said trellis encoder unit from information received from said data interleaver unit, and wherein said control block is capable of setting a value of alpha ($\alpha$) within said symbol mapper unit in accordance with an identification of said bytes within said trellis encoder unit.

7. An apparatus as claimed in claim 6 wherein said control block sets a value of alpha ($\alpha$) equal to zero (0) when said bytes within said trellis encoder unit are to be encoded as standard ATSC 8-VSB symbols.

8. An apparatus as claimed in claim 6 wherein said control block sets a value of alpha ($\alpha$) equal to one (1) when said bytes within said trellis encoder unit are to be encoded as robust ATSC 8-VSB symbols.

9. An apparatus as claimed in claim 6 wherein said control block sets a value of alpha ($\alpha$) equal to two (2) when said bytes within said trellis encoder unit are to be encoded as robust ATSC 8-VSB symbols.

10. An apparatus as claimed in claim 6 further comprising a non-systematic Reed Solomon encoder coupled to said data interleaver unit and to said trellis encoder of said trellis encoder unit, said non-systematic Reed Solomon encoder capable of providing said apparatus with backward compatibility for an existing ATSC 8-VSB receiver.

11. An apparatus as claimed in claim 6 further comprising a software implemented Reed Solomon encoder capable of encoding bits for said first Reed Solomon encoder, and for said second Reed Solomon encoder, and for said third Reed Solomon encoder.

12. An Advanced Television Systems Committee (ATSC) 8-VSB digital system comprising an apparatus for generating an ATSC 8-VSB bit stream that comprises a robust ATSC 8-VSB bit stream, said apparatus comprising:
 a Reed Solomon encoder unit capable of encoding a plurality of ATSC 8-VSB bit streams, said Reed Solomon encoder unit comprising:
 a first Reed Solomon encoder capable of encoding a first bit stream that comprises a standard ATSC 8-VSB bit stream;
 a hierarchical block capable of encoding a second bit stream, wherein said second bit stream comprises a first portion of bits to be encoded as robust ATSC 8-VSB bits and a second portion of bits to be encoded as standard embedded ATSC 8-VSB bits; and
 a first multiplexer having a first input coupled to an output of said first Reed Solomon encoder and having a second input coupled to an output of said hierarchical block, said multiplexer capable of multiplexing said first bit stream and said second bit stream.

13. An ATSC 8-VSB digital system as claimed in claim 12 wherein said first bit stream received by said first Reed Solomon encoder comprises a standard stream of bits and wherein said second bit stream received by said hierarchical block comprises a new stream of bits.

14. An ATSC 8-VSB digital system as claimed in claim 12 wherein said first portion of bits to be encoded as robust ATSC 8-VSB bits comprises half of the bits received by said hierarchical block and where said second portion of bits to be encoded as standard embedded ATSC 8-VSB bits comprises half of the bits received by said hierarchical block.

15. An ATSC 8-VSB digital system as claimed in claim 12 wherein said hierarchical block comprises:
 a second Reed Solomon encoder capable of encoding said first portion of bits to be encoded as robust ATSC 8-VSB bits;
 a third Reed Solomon encoder capable of encoding said second portion of bits to be encoded as standard ATSC 8-VSB bits; and a second multiplexer having a first input coupled to an output of said second Reed Solomon encoder and having a second input coupled to an output of said third Reed Solomon encoder, said second multiplexer capable of multiplexing said first portion of bits and said second portion of bits, said second multiplexer having an output coupled to an input of said first multiplexer.

16. An ATSC 8-VSB digital system as claimed in claim 15 wherein said apparatus further comprises a trellis encoder unit capable of being coupled to an output of a data interleaver unit coupled to an output of said first multiplexer of said Reed Solomon encoder unit, said trellis encoder unit comprising:
   a trellis encoder coupled to said output of said data interleaver unit; and
   a symbol mapper unit coupled to said trellis encoder, wherein said symbol mapper unit has an output symbol R value of minus one minus alpha (−1+α) assigned to a $Z_2$ $Z_1$ $Z_0$ bit combination of zero one one (011), and wherein said symbol mapper unit has an R value of plus one plus alpha (+1+α) assigned to a $Z_2$ $Z_1$ $Z_0$ bit combination of one zero zero (100), where alpha (α) has a variable integer value.

17. An ATSC 8-VSB digital system as claimed in claim 16 further comprising a control block coupled to said data interleaver unit and to said symbol mapper unit, wherein said control block is capable of identifying bytes within said trellis encoder unit from information received from said data interleaver unit, and wherein said control block is capable of setting a value of alpha (α) within said symbol mapper unit in accordance with an identification of said bytes within said trellis encoder unit.

18. An ATSC 8-VSB digital system as claimed in claim 17 wherein said control block sets a value of alpha (α) equal to zero (0) when said bytes within said trellis encoder unit are to be encoded as standard ATSC 8-VSB symbols.

19. An ATSC 8-VSB digital system as claimed in claim 17 wherein said control block sets a value of alpha (α) equal to one (1) when said bytes within said trellis encoder unit are to be encoded as robust ATSC 8-VSB symbols.

20. An ATSC 8-VSB digital system as claimed in claim 17 wherein said control block sets a value of alpha (α) equal to two (2) when said bytes within said trellis encoder unit are to be encoded as robust ATSC 8-VSB symbols.

21. An ATSC 8-VSB digital system as claimed in claim 17 further comprising a non-systematic Reed Solomon encoder coupled to said data interleaver unit and to said trellis encoder of said trellis encoder unit, said non-systematic Reed Solomon encoder capable of providing said apparatus with backward compatibility for an existing ATSC 8-VSB receiver.

22. An ATSC 8-VSB digital system as claimed in claim 17 further comprising a software implemented Reed Solomon encoder capable of encoding bits for said first Reed Solomon encoder, and for said second Reed Solomon encoder, and for said third Reed Solomon encoder.

23. A method for generating an Advanced Television Systems Committee (ATSC) 8-VSB bit stream that comprises a robust ATSC 8-VSB bit stream, said method comprising the steps of:
   encoding a first bit stream that comprises a standard ATSC 8-VSB bit stream in a first Reed Solomon encoder of a Reed Solomon encoder unit;
   encoding a second bit stream in a hierarchical block of said Reed Solomon encoder unit, wherein said second bit stream comprises a first portion of bits to be encoded as robust ATSC 8-VSB bits and a second portion of bits to be encoded as standard embedded ATSC 8-VSB bits; and
   multiplexing said first bit stream and said second bit stream in a first multiplexer having a first input coupled to an output of said first Reed Solomon encoder and having a second input coupled to an output of said hierarchical block.

24. A method as claimed in claim 23 wherein said first bit stream received by said first Reed Solomon encoder comprises a standard stream of bits and wherein said second bit stream received by said hierarchical block comprises a new stream of bits.

25. A method as claimed in claim 23 wherein said first portion of bits to be encoded as robust ATSC 8-VSB bits comprises half of the bits received by said hierarchical block and where said second portion of bits to be encoded as standard embedded ATSC 8-VSB bits comprises half of the bits received by said hierarchical block.

26. A method as claimed in claim 23 further comprising the steps of:
   encoding said first portion of bits to be encoded as robust ATSC 8-VSB bits in a second Reed Solomon encoder of said hierarchical block;
   encoding said second portion of bits to be encoded as standard ATSC 8-VSB bits in a third Reed Solomon encoder of said hierarchical block; and
   multiplexing said first portion of bits and said second portion of bits within a second multiplexer, said second multiplexer having a first input coupled to an output of said second Reed Solomon encoder, and having a second input coupled to an output of said third Reed Solomon encoder, and having an output coupled to an input of said first multiplexer.

27. A method as claimed in claim 26 further comprising the steps of:
   coupling a data interleaver unit to an output of said first multiplexer of said Reed Solomon encoder unit;
   coupling a trellis encoder unit to an output of said data interleaver unit, wherein said trellis encoder unit comprises a trellis encoder and a symbol mapper unit;
   assigning to a $Z_2$ $Z_1$ $Z_0$ bit combination of zero one one (011) in said symbol mapper unit an output symbol R of minus one minus alpha (−1+α); and
   assigning to a $Z_2$ $Z_1$ $Z_0$ bit combination of one zero zero (100) in said symbol mapper unit an R value of plus one plus alpha (+1+α), where alpha (α) has a variable integer value.

28. A method as claimed in claim 27 further comprising the steps of:
   coupling a control block to said data interleaver unit and to said symbol mapper unit;
   receiving in said control block information from said data interleaver that identifies bytes within said trellis encoder unit; and
   setting a value of alpha (α) within said symbol mapper unit in accordance with an identification by said control block of said bytes within said trellis encoder unit.

29. A method as claimed in claim 28 further comprising the step of:
   setting said value of alpha (α) equal to zero (0) when said bytes within said trellis encoder unit are to be encoded as standard ATSC 8-VSB symbols.

30. A method as claimed in claim 28 further comprising the step of:

setting said value of alpha (α) equal to one (1) when said bytes within said trellis encoder unit are to be encoded as robust ATSC 8-VSB symbols.

31. A method as claimed in claim 28 further comprising the step of:
setting said value of alpha (α) equal to two (2) when said bytes within said trellis encoder unit are to be encoded as robust ATSC 8-VSB symbols.

32. A method as claimed in claim 28 further comprising the step of:
coupling a non-systematic Reed Solomon encoder to said data interleaver unit and to said trellis encoder of said trellis encoder unit; and
providing from said non-systematic Reed Solomon encoder backwardly compatible robust ATSC 8-VSB data streams that are capable of being received by an existing ATSC 8-VSB receiver.

33. A method as claimed in claim 28 further comprising the steps of:
encoding bits for said first Reed Solomon encoder in a software implemented Reed Solomon encoder;
encoding bits for said second Reed Solomon encoder in said software implemented Reed Solomon encoder; and
encoding bits for said third Reed Solomon encoder in said software implemented Reed Solomon encoder.

34. A signal comprising:
a robust Advanced Television Systems Committee (ATSC) 8-VSB bit stream comprising a first plurality of bits trellis encoded in a trellis encoder unit comprising a symbol mapper unit wherein:
a $Z_2$ $Z_1$ $Z_0$ bit combination of zero one one (011) in said symbol mapper unit is assigned an output symbol R of minus one minus alpha (−1+α); and
a $Z_2$ $Z_1$ $Z_0$ bit combination of one zero zero (100) in said symbol mapper unit is assigned an R value of plus one plus alpha (+1+α), where alpha (α) is a variable integer value.

35. A signal as claimed in claim 34 wherein said value of alpha (α) is equal to one (1).

36. A signal as claimed in claim 34 wherein said value of alpha (α) is equal to two (2).

37. A signal as claimed in claim 34 further comprising:
a standard ATSC 8-VSB bit stream comprising a second plurality of bits trellis encoded in said trellis encoder unit comprising said symbol mapper unit wherein said value of alpha (α) is equal to zero (0).

38. A signal as claimed in claim 37 wherein said value of alpha (α) is equal to one (1) for said first plurality of bits within said robust ATSC 8-VSB bit stream.

39. A signal as claimed in claim 37 wherein said value of alpha (α) is equal to two (2) for said first plurality of bits within said robust ATSC 8-VSB bit stream unit.

40. A signal as claimed in claim 37 wherein said robust ATSC 8-VSB bit stream and said standard ATSC 8-VSB bit stream are multiplexed.

41. A signal as claimed in claim 40 wherein said value of alpha (α) is equal to one (1) for said first plurality of bits within said robust ATSC 8-VSB bit stream.

42. A signal as claimed in claim 40 wherein said value of alpha (α) is equal to two (2) for said first plurality of bits within said robust ATSC 8-VSB bit stream.

43. A signal as claimed in claim 40 wherein said robust ATSC 8-VSB bit stream comprises approximately half of the bits within said signal and wherein said standard ATSC 8-VSB bit stream comprises approximately half of the bits within said signal.

44. A signal as claimed in claim 43 wherein said value of alpha (α) is equal to one (1) for said first plurality of bits within said robust ATSC 8-VSB bit stream.

45. A signal as claimed in claim 43 wherein said value of alpha (α) is equal to two (2) for said first plurality of bits within said robust ATSC 8-VSB bit stream.

* * * * *